April 2, 1968     A. R. BAGINSKI     3,376,094
CAMERA DRIVE CONTROL
Filed March 1, 1965     2 Sheets-Sheet 1
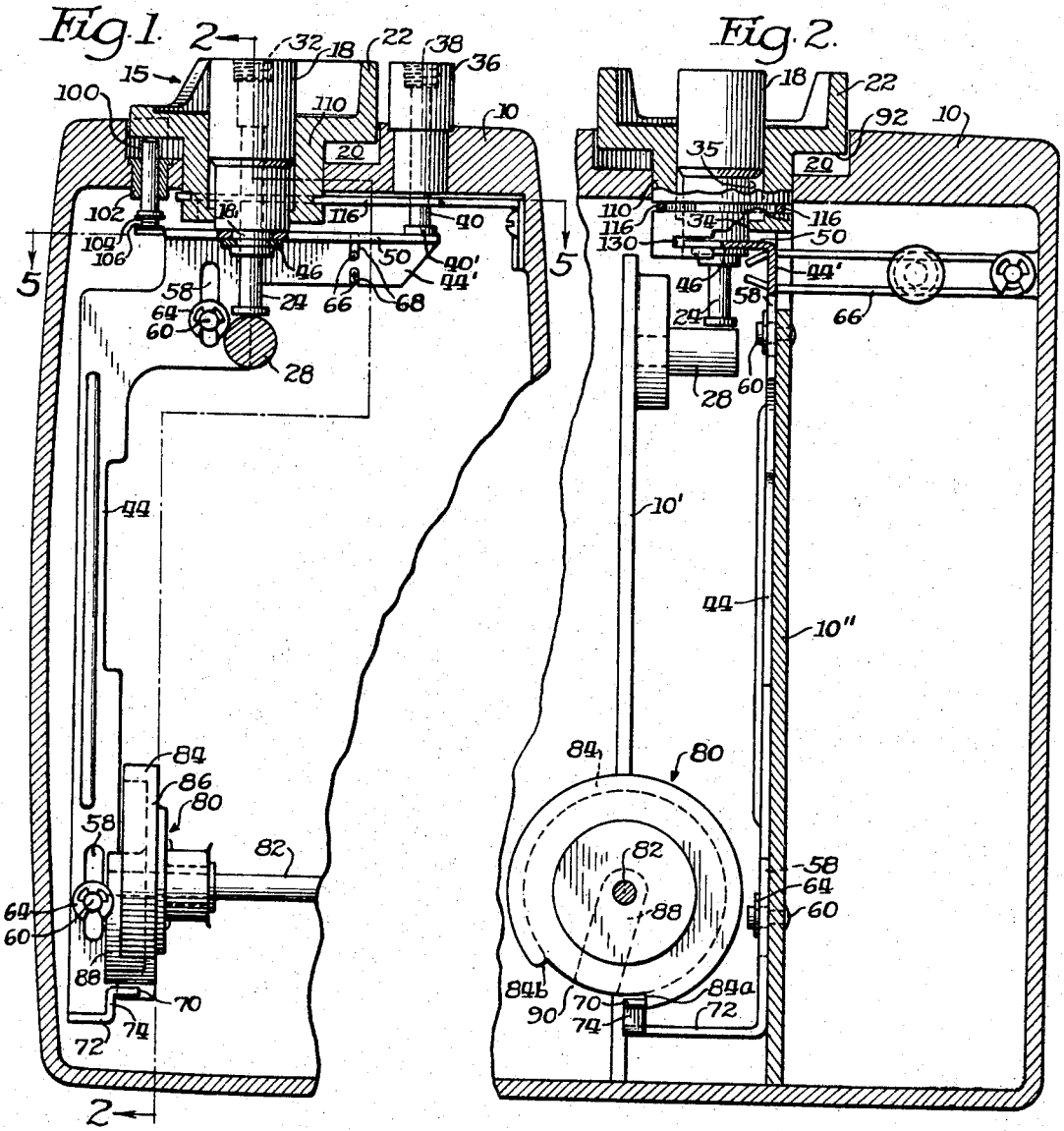
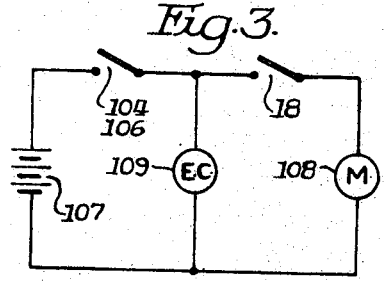
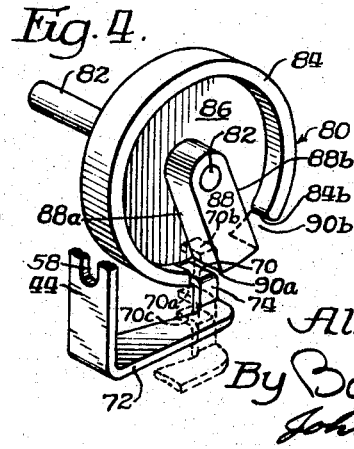
Inventor:
Albert R. Baginski.
By Barry L. Clark
John E. Peele Jr. Attys

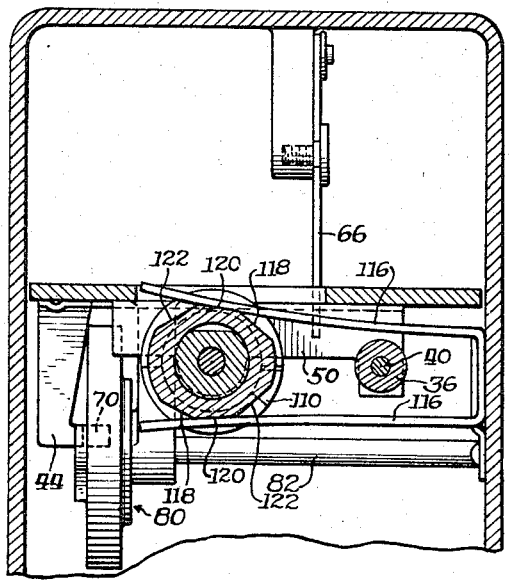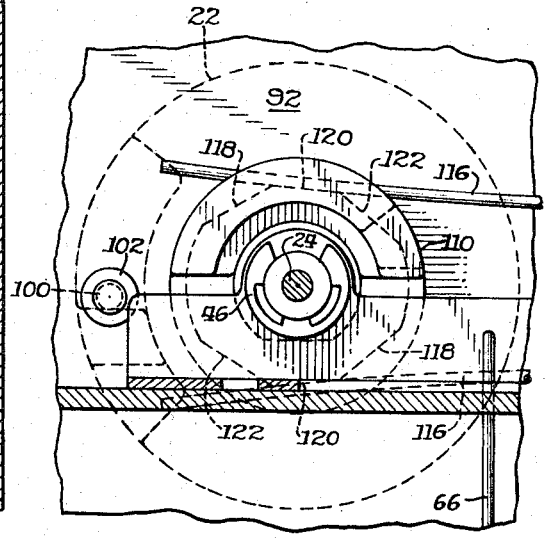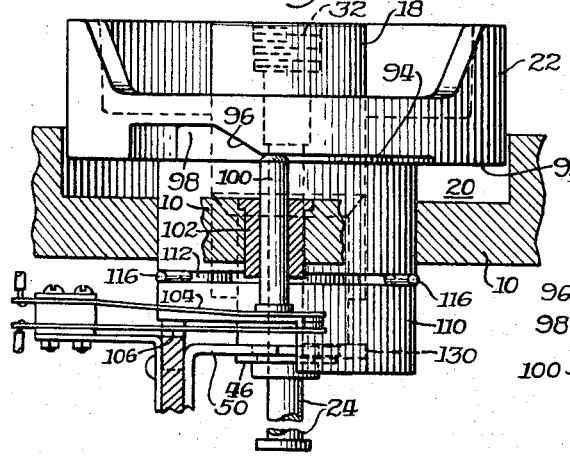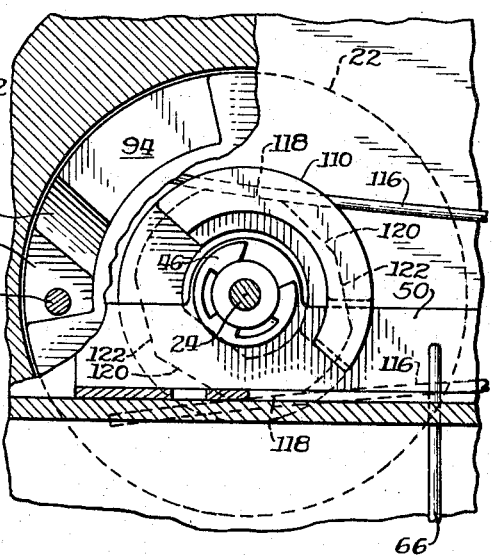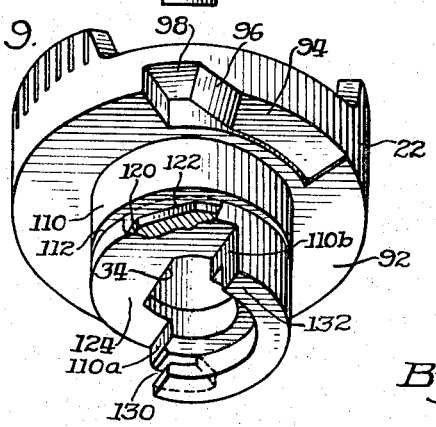

United States Patent Office 3,376,094
Patented Apr. 2, 1968

3,376,094
CAMERA DRIVE CONTROL
Albert R. Baginski, Chicago, Ill., assignor to Bell & Howell Company, Chicago, Ill., a corporation of Illinois
Filed Mar. 1, 1965, Ser. No. 436,005
6 Claims. (Cl. 352—137)

ABSTRACT OF THE DISCLOSURE

A manually operable camera drive control assembly having an elongated start button longitudinally movable to a plurality of positions relative to the housing of the camera, and a control ring surrounding the button and being rotatable between several positions in which it is releasably retained. Portions arranged on the control ring cooperate with the start button and a drive transmission actuator member longitudinally movable with the button, upon rotation of the control ring from one position to another. A spring urges the start button to a first position when said button has been displaced, and is released.

---

The instant invention relates to a motion picture camera and particularly to a control assembly including an interconnected start button assembly and a drive control mechanism.

The particular control assembly permits the operator of the camera to actuate the start button assembly and thereby the associated drive control mechanism to select from among the several operating functions of which the camera is capable, without having to manually actuate additional controls. The control assembly, which is operable in mechanical connection with the shutter mechanism and the camera drive, includes an actuator member and a foot portion on the actuator member movable relative to a transmission element connecting the camera drive to the shutter mechanism. The assembly is movable to permit the shutter mechanism either to operate in a conventional manner at normal speeds or at higher speeds producing "slow motion" or to operate through a single cycle to provide single frame exposures of film. The control assembly may also be locked in "off" or in "continuous" run conditions.

The present control mechanism incorporates several advantages in addition to the economic advantage gained through the use of a minimum number of simply constructed elements which cooperate in a trouble free, yet positive manner.

An object of the present invention is to provide a novel start button assembly for use in a motion picture camera capable of a plurality of functions through which assembly substantially all operating functions of the camera may be actuated.

Another object of the present invention is to provide a novel drive control mechanism operatively connected to a start button assembly for use in a motion picture camera to control the operation of the camera.

Still another object is to provide a drive control mechanism operatively connected to a start button assembly and having a portion capable of being positioned to positively stop the operation of a camera shutter mechanism when desired.

Yet another object of the present invention is to provide a start button assembly with a rotatable member operable with an actuator member to permit either complete deactivation of the camera power circuit or continuous run of the camera drive mechanism.

A still further object is to provide a novel camera control mechanism adapted for operation in a plurality of conditions and substantially interconnected to the drive mechanism of the camera.

Other objects of the invention will appear from the following detailed description of certain preferred embodiments thereof taken in connection with the accompanying drawings wherein:

FIG. 1 is a sectional front elevational view of the start button assembly and drive control mechanism elements of the present invention;

FIG. 2 is a sectional view taken on line 2—2 of FIG. 1 disclosing an elevational view of the elements;

FIG. 3 is a diagram of a typical circuit of a camera in which the present start button assembly may be used;

FIG. 4 is a perspective detail view of the transmission element and the foot portion of the actuator member with that portion disclosed in alternate positions;

FIG. 5 is a sectional view taken along line 5—5 of FIG. 1;

FIG. 6 is an enlarged sectional view of components of the start button assembly taken along a line similar to line 5—5 of FIG. 1 in the reverse direction;

FIG. 7 is a similar view of the components of FIG. 6 rotated and broken away in part;

FIG. 8 is a partially broken away enlarged elevational view of the start button assembly; and FIG. 9 is a perspective view of the ring portion of the start button assembly broken away in part.

In FIG. 1 is disclosed a motion picture camera housing 10 supporting the elements of the present invention. Extending through the upper portion of the housing is a camera control assembly 15 including an elongated substantially tubular start button 18 which is longitudinally movable relative to the housing through a hole therein. Within a recess 20 in housing 10 and surrounding start button 18 is a control ring 22. Control ring 22 is rotatable about an axis which extends through the start button 18. Extending substantially centrally into start button 18 and maintaining axial alignment thereof is a pin 24 which normally engages a fixed stud 28 formed on a mechanism plate 10' in camera housing 10. In the interior periphery of the uppermost portion of the start button 18 are formed a plurality of threads 32 into which a conventional cable release (not shown) with one portion thereof movable relative to another may be threaded. The lower interior periphery of control ring 22 is shaped in a modified D formation 34, the flat of which cooperates with a corresponding flattened area 35 on button 18 to prevent undesired rotation of button 18 when threading the cable release therein.

Adjacent start button 18 and control ring 22 is located a second cable release socket 36 which is press fitted or otherwise fixedly mounted in housing 10. The upper interior portion of socket 36 carries threading 38 into which a cable release may be threaded. Within socket 36 is an elongated plunger member 40 having a slightly enlarged head portion 40.' The plunger member is longitudinally movable when engaged by a moving portion of the cable release.

An elongated actuator member 44 is longitudinally slidably mounted within housing 10 in a manner so as to enable it to be moved by selected actuation of either start button 18 or plunger 40.

A substantially flat shelf portion 50 is bent from the upper body portion 44' of actuator member 44 at substantially a right angle thereto. Shelf portion 50 is thus engageable by the start button 18 and the plunger 40 to cause movement of the actuator member 44. A reduced end portion 18' of start button 18 extends through the shelf 50 and is prevented from axial displacement therefrom by an E-ring 46 slipped around that reduced end portion. The extent of motion of actuator 44 is limited by the length of slots 58, 58 as the actuator moves relative to studs 60, 60 fixed in a second mechanism plate 10" of the camera housing. E-rings 64 limit the motion of the actuator member 44 axially relative to the studs.

The motion of actuator member 44 is partially controlled by a biasing member 66, such as an elongated U-shaped spring, which is mounted on the housing 10 in a manner to urge actuator member 44 to a normal neutral or "off" position when it is caused to be moved from that position. Leg portions of spring 66 extend into a pair of slots 68, 68. The slots are formed in upper body portion 44' of actuator member 44 such that it may be moved upwardly or downwardly from the neutral position.

A latching or stop member 70, such as a foot, is formed as a lower portion of actuator member 44. A pair of plate sections 72, 74 are bent at angles to the body of actuator member 44 to permit the desired positioning of foot 70 relative to the actuator member and other elements with which it is to cooperate.

A transmission element or drive control mechanism 80 is mounted on a driven shaft 82. The shaft is operably connected with a drive motor (not shown), preferably of the known dual speed type, and shutter mechanism (not shown) of the motion picture camera to permit operation of the shutter only when the transmission element rotates. Transmission element 80 is preferably formed with a rim 84 extending partially about the periphery of a disk member 86 and extending axially therefrom a small amount. (See FIG. 4).

An arcuate space 90 exists between the end portions 84a, 84b of the rim 84. A stop lug means 88 is preferably molded as a portion of the transmission element 80 and is positioned on the disk periphery substantially centrally of the arcuate space 90. The radial extent of stop lug 88 is substantially equal to the interior radius of rim 84. The spaces 90a, 90b adjacent the sides 88a, 88b of stop lug 88 are preferably of an arcuate dimension only slightly larger than the width dimension of latching foot 70 so as to enable movement of the foot between one side of stop lug 88 and the adjacent edge of rim 84. The transmission element and the shutter are oriented with shaft 82 such that when the element is at its "at rest" position, (see FIG. 2.) the shutter closes the aperture gate (not shown) through which light would pass to expose film in the camera.

Again referring to control ring 22, as more particularly seen in FIG. 9, the ring has a lower disk-like surface 92 normally spaced slightly from the upper portion of the housing recess 20 in which it is seated. The surface 92 is indented with a cam surface portion 94 slightly below surface 92 and leading from an inclined cam portion 96 of a still deeper cam surface portion 98. These cam surfaces cooperate with a contact actuator pin member 100 (as seen in FIGS. 1 and 8). The contact actuator member is longitudinally movable in a bushing 102 formed in the housing 10. The member is normally biased into engagement with one of the cam surfaces 94, 96 by one of a pair of resilient normally open electrical contact elements 104, 106 which are in the main power circuit (see FIG. 3) of the camera. The circuit between the battery 107, the motor 108 and other elements, such as the exposure control system 109, is completed to permit operation of the camera mechanisms only when contact switches (not shown) are operated by start button 18. In the preferred circuit, the exposure control system 109 is energized whenever the contacts 104, 106 are closed, although the motor is not energized until start button 18 is actuated.

A reduced hollow cylindrical portion 110 of control ring 22 extends below the surface 92 thereof. Substantially centrally of the length of this reduced portion 110 is located a peripheral cutout 112 forming a recessed series of detents. A pair of arms of a U-shaped spring 116 mounted in housing 10 extend into the cutout 112 and into engagement with one of the pairs of flats or detents 118, 120, 122 (as seen more particularly in FIGS. 6, 7 and 9).

The lower extent of the reduced portion 110 is partially cut away at 124 to permit movement of the upper portion of actuator member 44 relative to control ring 22. The remaining part of the reduced portion 110 is formed as a semi-circle having a holding slot 130 in one lead edge 110a of the reduced portion 110. Shelf 50 of actuator member 44 is normally aligned to be selectively held in the slot when the ring is rotated to entrap it. The other lead edge 110b is formed as a solid surface. The lower-most planar surface 132, adjacent edge portion 110b, is locatable over shelf 150 as a restraining portion limiting upward motion of actuator member 44 when the button 18 is depressed and the ring is rotated in a direction opposite to that which would entrap the member 44.

The cooperation of the various elements of the present invention permits a plurality of camera functions to be controlled from a single camera control assembly. The application of manual pressure upon start button 18 causes actuator member 44 to be moved in an inward direction relative to housing 10. The motor and therefore the transmission element 80 have been "energized" but are held inoperative until the transmission element is released by removal of the foot 70 from the path of movement of rim 84. As seen in dotted lines in FIG. 4, when the start button is depressed, foot portion 70 moves to the outside of rim 84 (shown in dotted lines as 70a) permitting continuous rotation of transmission element 80 and the elements actuated thereby through attachment to shaft 82. Thus, the control of camera operation at desired times by manual operation of the start button is accomplished. With depression of start button 18, spring 66 is deflected from its normally neutral position. Release of the start button permits spring 66 to return the actuator member 44 to the normally "off" position with the foot 70 in the path of rim 84, thus stopping the rotation of transmission element 80. If the button is released at a time other than at the end of a cycle of camera operation, foot 70 will engage the outside periphery of rim 84 until it drops off into space 90 and is engaged by rim edge 84a.

When it is desired to lock the camera in an "off" condition, such as for storage, it is necessary only to rotate control ring 22 and entrap shelf member 50 of the actuator member 44 in the slot 130 of the control ring. The entrapment prevents longitudinal movement of the actuator member and likewise the foot 70. The shelf 50 is aligned with slot 130 when the actuator member is in the neutral or "off" position. The control ring 22 is maintained as rotated by the engagement of the arms of the U-spring 116 in detents 118. Further, the entire electrical system of the camera is disconnected due to the opening of contacts 104, 106 because contact actuator pin 100 has permitted the contact elements to separate.

To return the camera to the "run" condition, previously described, from the "locked off" condition, control ring 22 is rotated until the spring arms 116 engage detents 120. Simultaneously, the shelf 50 is freed from slot 130 and the contacts 104, 106 are again closed by the engagement of cam surface 94 with contact actuator pin 100.

Should the operator now desire to operate the camera in a single frame manner, it is only necessary that he thread a cable release (not shown) into the threaded portion 32 of start button 18. The application of pressure on the remote end of the cable release causes the core thereof to apply pressure on fixed pin 24 and thereby cause relative movement of button 18 outwardly of housing 10. Because the shelf 32 of actuator member 44 is held to the start button, the actuator member is moved in a similar direction. The latching foot 70 is thus caused to move to the inside of rim 84 (in the dotted line position 70b as seen in FIG. 4). Rotation of the transmission element 80 then occurs until the stop lug 88 is rotated almost a full circle and side 88b engages latching foot 70. Thus, almost a single cycle has been accomplished by the transmission element and associated components. No further rotation of transmission element 80 will occur until the cable release and therefore the actuator member 44 and foot 70 have been released, permitting foot 70 to drop to the normally "off" position and the transmission element to rotate the small angular distance necessary to complete the cycle. It is noted that spring 66 which was deflected upwardly when the start button and actuator member 44 were moved, has urged them to return to their normally "off" positions.

It is often desirable to operate the camera from a remote position. Such remote operation is accomplished by insertion of the cable release into the socket 36. Application of pressure on the remote end of the cable release causes the plunger member 40 to apply a force against shelf 50 to depress actuator member 44 in the same manner as when pressure is applied thereagainst by actuation of start button 18. This operation can occur only when detents 120 of control ring 22 are engaged by arms of spring 116.

When it is desired to lock the camera in a "continuous run" condition to permit continued actuation of the motor and shutter mechanism, start button 18 is depressed to the run position and control ring 22 is rotated until spring arms 116 are seated against detents 122. The shelf 50 of actuator member 44 is depressed to clear the lowermost planar surface 132 of reduced portion 110 of ring 22 such that the surface 132 may be rotated to a position over shelf 50, to maintain it depressed. Spring 66 is deflected in a downward manner and urges actuator member 44 in an upward direction to engage the planar surface 132 until the control ring is rotated to permit upward movement of the member into the open area 124 of the portion 110. Thus, the foot 70 is maintained outside of the path of movement of rim 84 (dotted line position 70a) and the camera continues to operate until the control ring 22 is again rotated such that spring arms 116 again engage detent portions 120 and spring arm 66 returns actuator member 44 and the foot 70 to their normal "off" position.

Provision is made such that "slow motion" operation of the camera may be obtained by further depression of start button 18 from the "run" position to a still more depressed position. Such further depression causes foot member 70 to be urged downwardly another increment away from transmission element 80 (dotted line position 70c). The function of element 80 is not altered, although the motor and shutter mechanism are operated at a faster rate in a manner well known in the art. It is noted that the instant embodiment permits going from the "continuous run" condition to "slow motion" and back again, if desired. The operator may also go directly into "slow motion" from the normally "off" condition by passing through the "run" condition delayed only by the extended stroke necessarily applicable to the start button. The "slow motion" operation is possible when either detents 120 or 122 are engaged by spring arms 116.

It is to be understood that the concepts of the present invention are equally applicable to a spring powered camera although this preferred mode has been described as related to an electrically powered camera.

I claim:

1. A camera control assembly for use in a motion picture camera having a housing, said assembly including:
   a start button displaceable relative to the exterior of said housing between a first position and at least one second position;
   control means surrounding and rotatable relative to said start button means between a first position and at least one second position;
   actuator means within said housing operably connected to said start button means for displacement therewith;
   biasing means in said housing engaging said actuator means to cause return movement of said start button to said first position when said start button is released after being displaced to one of said second positions;
   detent means on said control means;
   second biasing means in said housing adapted to cause said control means to be maintained in a selected position when at least one of said detent means is engaged by said second biasing means; and
   blocking means on said control means cooperating with said actuator member to retain said start button means in one of said positions when said control means is in one of said positions.

2. In a camera control assembly for a multiple function motion picture camera having a housing, the assembly including:
   a start button movable relative to said housing and adapted to be manually actuated between a plurality of positions;
   control means manually movable to several positions relative to said start button;
   said control means having a portion extending within said housing;
   an actuator member movable within said housing between a plurality of positions;
   said actuator member being operably connected to said start button and adapted to be engaged by said control means when moved by said start button to at least one of said plurality of positions;
   slot means defined by a portion of said control means within said housing adapted to be positioned about a portion of said actuator member when said actuator member is at one of said plurality of positions;
   a holding portion on said interior portion of said control means within said housing;
   said holding portion being movable into holding engagement with said actuator member when said actuator member is moved by said start button to another of said plurality of positions;
   groove means in said control means;
   detent surfaces in said groove means for each of said several positions; and
   means in said housing adapted to engage at least one of said detent surfaces when said control means is moved to retain said control means in one of said positions, whereby said camera function is changed as said control means and said start button positions are changed.

3. In a camera control assembly for a multifunction motion picture camera having a housing, the assembly including:
   start button means movable relative to said housing and adapted to be manually displaced from a first longitudinal position to a second position;
   a drive transmission actuator member operably connected to said start button means within said housing for movement therewith to control the camera function;
   resilient means in said housing in operative connection with said actuator member to bias said member to the first position from said second position;
   control means extending at least partially into said housing in substantially surrounding relation with said start button means and being rotatable about said start button means;
   blocking means on said control means interior of said housing to retainingly engage said actuator member in two of said longitudinal positions to which said actuator member is positionable with said start button means;
   detent means on said control means; and
   detent engaging means in said housing to releasably retain said control means in a selected rotated position whereby said actuator member is retained in said displaced condition until said detent means is moved free of said detent engaging means by rotation of said control means, and said resilient means biases said actuator member to said first position.

4. A start button assembly as in claim 3 wherein said start button means is longitudinally displaceable between a first position and a plurality of second positions;

said actuator means is displaceable therewith to each of said positions; and said blocking means of said control means is operable to retain said start button means and said actuator means in at least two of said positions.

5. A camera control assembly as in claim 4 wherein said actuator means is an elongated member longitudinally displaceable in said housing through a plurality of in-line positions; and said blocking means of said control means retains said actuator member non-displaceably in one of said longitudinal positions, and displaceable in one direction only in the other of said longitudinal positions.

6. A camera control assembly as in claim 3 wherein said blocking means of said control means includes;

a slot defining portion to block said actuator member against displacement when said actuator member is in one displacement and said control means is in one rotated position and to release said member when said control means is in another rotated position; and a surface portion to block said actuator member against displacement in one direction only when said actuator member is in another displaced position and said control means is in one rotated position, and to release said member when said control means is in another rotated position, said start button being movable to another position while said surface position of said control means is in blocking condition.

References Cited

UNITED STATES PATENTS 3,048,082   8/1962   Ferrari et al. _____ 352—178

FOREIGN PATENTS 1,170,164   9/1958   France.

JULIA E. COINER, *Primary Examiner.*

NORTON ANSHER, *Examiner.*